United States Patent [19]

Smallwood

[11] Patent Number: 5,596,828
[45] Date of Patent: Jan. 28, 1997

[54] ENDLESS BELT DISPLAY DEVICE

[76] Inventor: Paul Smallwood, 12015 Craigview, St. Louis, Mo. 63146

[21] Appl. No.: 558,210

[22] Filed: Nov. 16, 1995

Related U.S. Application Data

[63] Continuation of Ser. No. 230,101, Apr. 20, 1994, abandoned.

[51] Int. Cl.⁶ .................................................. G09F 11/12
[52] U.S. Cl. .............................. 40/524; 40/518; 40/661
[58] Field of Search ............................ 40/472, 524, 525, 40/471, 518, 478, 483, 512, 514, 661

[56] References Cited

U.S. PATENT DOCUMENTS

| | | | |
|---|---|---|---|
| 3,395,472 | 8/1968 | Look | 40/472 |
| 3,426,461 | 2/1969 | Miller | 40/518 |
| 3,754,342 | 8/1973 | Santacroce et al. | 40/472 X |
| 3,849,918 | 11/1974 | Mazzocco, Sr. | 40/472 |
| 4,769,202 | 9/1988 | Eroskey et al. | 264/166 |
| 4,827,644 | 5/1989 | Trame | 40/472 |
| 5,072,533 | 12/1991 | Doepgen et al. | 40/518 |
| 5,165,526 | 11/1992 | Conklin, Jr. | 198/804 |
| 5,209,340 | 5/1993 | Munkner et al. | 198/502.1 |
| 5,280,831 | 1/1994 | Conklin, Jr. | 198/502.1 |
| 5,353,534 | 10/1994 | Fassaver et al. | 40/524 |
| 5,358,094 | 10/1994 | Molinara et al. | 40/524 X |
| 5,362,540 | 11/1994 | Keng | 40/661 X |
| 5,477,633 | 12/1995 | Leinberger | 40/661 X |

FOREIGN PATENT DOCUMENTS

| | | | |
|---|---|---|---|
| 2115414 | 10/1972 | Germany | 40/518 |
| 3905984 | 8/1990 | Germany | 40/661 |
| 2238417 | 5/1991 | United Kingdom | 40/518 |

*Primary Examiner*—Peter M. Cuomo
*Assistant Examiner*—James O. Hansen
*Attorney, Agent, or Firm*—Haverstock, Garrett and Roberts

[57] ABSTRACT

An endless belt display device adapted for mounting on a conveyor system for rotatably moving the device comprises an endless belt having a top surface and a transparent panel having all but one edge bonded to the top surface of the belt, the panel forming a pocket with the belt and adapted for receiving advertisement through the unbonded edge to be viewed through the panel as the belt is being rotated by the conveyor system.

11 Claims, 1 Drawing Sheet

ENDLESS BELT DISPLAY DEVICE

This application is a continuation of Ser. No. 230,101 filed Apr. 20, 1994 now abandoned.

BACKGROUND OF THE INVENTION

This invention relates to a device for displaying visual information and more particularly to a device for displaying advertisment on movable conveyor belts at checkout stations.

Belt driven devices for moving items, such as food products at checkout counters at retail establishments such as grocery stores are used to assist workers to quickly move products to a scanning station to input the price for each product. Typically, these belt driven devices consists of an endless belt which is driven by a pair of roller assemblies. As the rollers move, the belt is rotated thereby moving products placed on the belt. Although these belts are useful for their intended function additional uses for these belts have been found. One such other use is to provide advertisements on the belt for customers to view while standing in line during the checkout process. One such known method of providing advertisement is to print advertisments on the belt itself, however, due to the printing process the ads wear off over time and the entire belt needs to be replaced. Another known method is to place stickers on the belts. However, stickers typically have poor durability and also wear off over time which again requires the total replacement of the belt.

The present invention is designed to obviate and overcome many of the disadvantages and shortcomings experienced with the display devices discussed hereinbefore and with other devices used in the past, and to provide an endless belt display device which can be easily utilized to display advertisement on endless belts. Moreover, since the endless belt display device of the present invention does not require that the advertisement be printed on or adhered to the belt it offers the advantage that advertisements may be easily installed or removed from the belt without changing or removing the belt.

SUMMARY OF THE INVENTION

An endless belt display device adapted for mounting on a conveyor system for rotatably moving the device is disclosed in which the device comprises an endless belt having a top surface and a transparent panel having all but one edge bonded to the top surface of the belt, the panel forming a pocket with the belt and adapted for receiving advertisement through the unbonded edge to be viewed through the panel as the belt is being rotated by the conveyor system.

In another form of the present invention a visual display device comprises a flexible conveyor belt having a top surface and a top edge, means for rotating the belt for recirculating movement along an endless path and a transparent panel having all but one edge bonded to the top surface of the belt, the panel forming a pocket with the belt through which an advertisement is placed to be viewed through the panel while the belt is being recirculated along the endless path.

In still another form of the present invention an endless belt display device adapted for mounting on a conveyor system having a pair of opposed rollers for rotatably moving the device comprises a belt formed as a continuous loop encircling the rollers and driven thereby, the belt having a top surface and a transparent panel having all but one edge bonded to the top surface of the belt, the panel forming a first pocket and a second pocket with the top surface of the belt, the first pocket adapted for receiving an advertisement through the unbonded edge of the panel and for displaying the advertisement through the panel during rotation of the belt by the rollers the second pocket formed with the top surface of the belt by forming a seam between the first and second pockets, the second pocket adapted for receiving a second advertisment through the unbonded edge of the panel and for displaying the advertisement through the panel during rotation of the belt by the rollers.

In light of the foregoing comments, it will be recognized that a principal object of the present invention is to provide an improved endless belt display device.

A further object of the invention is to provide an endless belt display device which is of simple construction and design and which can be easily employed with highly reliable results.

Another object of the invention is to provide an endless belt display device which is durable and easy to clean.

A still further object of the invention is to provide an endless belt display device in which the advertisement can be easily and quickly changed.

Another object of the present invention is to provide a method for installing and removing visual information on an endless belt.

These and other objects and advantages of the present invention will become apparent after considering the following detailed specification in conjunction with the accompanying drawings, wherein:

DETAILED DESCRIPTION OF THE PREFERRED EMBODIMENT

Figure 1:
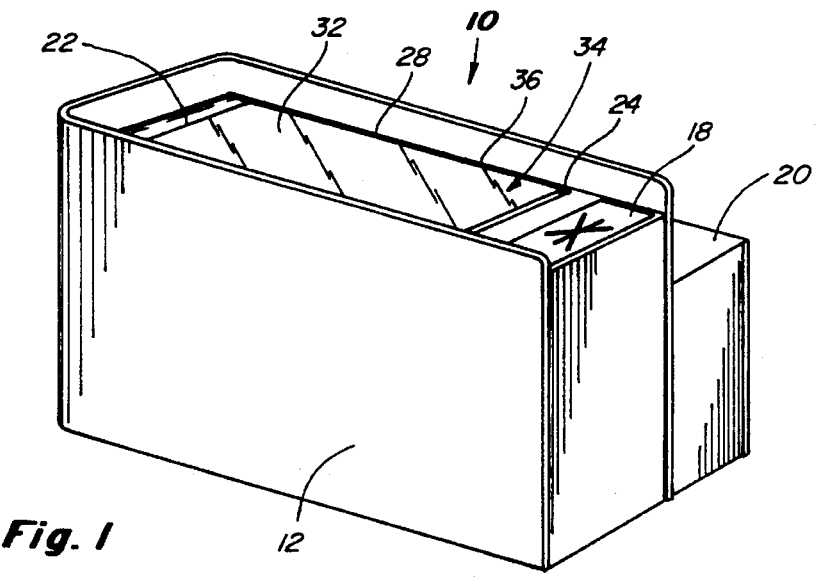
FIG. 1 is a perspective view of a preferred embodiment of an endless belt display device constructed according to the present invention and installed on a checkout counter.
Figure 2:
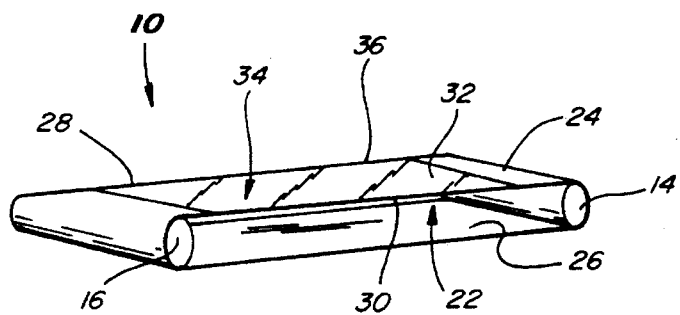
FIG. 2 is a perspective view of the endless belt display device of FIG. 1 with the checkout counter removed to illustrate the roller assemblies.

Referring now to the drawings, wherein like numbers refer to like items, number 10 identifies a preferred embodiment of the endless belt display device of the present invention. Referring now in particularly to FIGS. 1 and 2, there is illustrated the endless belt display device 10 of the present invention installed on a conventional checkout counter 12 found in grocery stores. The checkout counter 12 includes the endless belt display device 10 mounted on a pair of opposed roller assemblies 14 and 16, a scanner unit 18 used for scanning in the universal product code (UPC) of a product, and a cash register stand 20 located on a side of the counter 12 where a cashier or checker stands.

The endless belt display device 10 comprises a belt 22 having a top surface 24 and a bottom surface 26. The top surface 24 has a top edge 28 and a bottom edge 30. The belt 22 is constructed of polyurethane and may consist of a single ply or mutiple plies. The approximate preferred thickness of the belt 22 is 0.055 inch. An example of such a belt 22 is manufactured by Burrell Leder Beltech, Inc. and is identified as belt number D92BC. A transparent panel 32 is bonded or adhered to the top surface 24 of the belt 22. The transparent panel 32 has preferrably a rectangular shape which is the shape of the belt 22. All but one of the edges of the panel 32 are bonded to the top surface 24. The panel 32 forms a pocket 34 with the top surface 24 of the belt 22. One edge 36 is left unbonded to allow a visual display or advertisement to be easily inserted into or removed from the pocket 34. The edge 36 is preferably the edge parallel with the top edge 28 of the top surface 24 of the belt 22. The edge 36 is also perferably located on the side of the counter 12 where the checker stands. Once the device 10 is installed and tensioned properly about the roller assemblies 14 and 16, as depicted in FIG. 2, the unbonded edge 36 is taunt and the top edge 28 and the edge 36 are effectively sealed together. The transparent panel 32 is constructed of a clear urethane. The panel 32 is bonded to the top surface 24 by using the method of high frequency welding of the panel 32 to the top surface 24. Other methods of bonding the panel 32 to the top surface 24 of the belt 22 may be employed such as heat sealing or using adhesives. Although the panel 32 is shown extending over a portion of the the top surface 24 of the belt 22, it is also possible and contemplated that the panel 32 will extend over the entire top surface 24 of the belt 22. The device 10 is a light weight device which permits easy installation and removal of the device 10 from the roller assemblies 14 and 16 of the checkout counter 12.

The belt 22 has its ends (not shown) connected together to form a continuous loop of a size that will fit snugly about the roller assemblies 14 and 16 when the roller assemblies 14 and 16 are tensioned properly. When the belt 22 is installed over the roller assemblies 14 and 16, as shown in FIGS. 1 and 2, it can travel in a generally horizontal plane. The ends of the belt 22 are connected together by any well known method, such as by having lacings at the ends with the lacings being held together by a lacing pin or by having splices at the ends with the splices being heat welded together.

Figure 3:
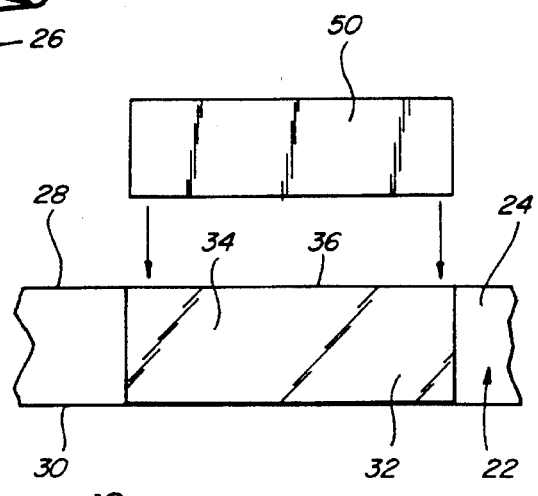
FIG. 3 is a top plan view of the endless belt display device shown with advertisement being installed.

FIG. 3 illustrates the procedure required to install a visual display or advertisement 50 into the pocket 34 formed by the panel 32 and the top surface 24 of the belt 22. As is known with conventional conveyor belts, to place or remove a conveyor belt such as the belt 22 from the roller assemblies 14 and 16, tensioning bolts (not shown) are loosened sufficiently to effectively decrease the span between the roller assemblies 14 and 16. Slack is thereby provided so that the panel 32 and the top surface 24 of the belt 22 can be easily separated at the unbonded edge 36. Once separated, an advertisement 50 is inserted into the pocket 34. The advertisement 50 may be any suitable size and shape only limited by the size and shape of the pocket 34. The advertisment 50 may also contain any suitable or desired advertisement or visual display. Once the advertisement 50 is inserted into the pocket 34 the roller assemblies 14 and 16 are moved back into their tensioned positions and the tensioning bolts are tightened. The advertisement 50 is effectively sealed in place in the pocket 34. With this arrangement the endless belt display device 10 can be operated for extended periods of time without any deterioration or damage to the advertisement 50. It is also possible that the advertisement 50 may include an adhesive on its front or back or both sides to help in placing the advertisement 50 in a particular position or location within the pocket 34. For example, the advertisement 50 may be sized and shaped to be smaller than the size of the pocket 34 and it would be preferred to center the advertisment 50 in the pocket 34. Additionally, the advertisment 50 may have adhesive only on its top edge, the top edge being adjacent the top edge 36, to retain the advertisement 50 in place within the pocket 34.

If it is ever required to replace the endless belt display device 10 with a similar device 10, tensioning bolts (not shown) are loosened sufficiently to effectively decrease the span between the roller assemblies 14 and 16. Slack is thereby provided so that the belt 22 can be easily removed and a new belt 22 installed. Once the new belt 22 is installed the roller assemblies 14 and 16 are moved back into their tensioned positions and the tensioning bolts are tightened.

Figure 4:
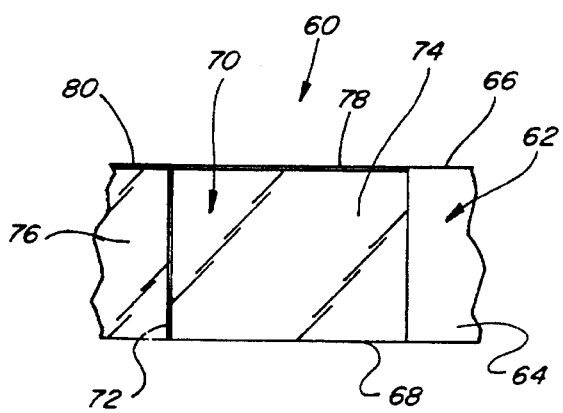
FIG. 4 is a top plan view of a second preferred embodiment of the endless belt display device of the present invention.

FIG. 4 depicts a second preferred embodiment 60 of an endless belt display device of the present invention. The endless belt display device 60 comprises a belt 62 having a top surface 64. The top surface 64 has a top edge 66 and a bottom edge 68. The belt 62 is constructed of polyurethane and may consist of single ply or multiple plies. The approximate preferred thickness of the belt 62 is 0.055 inch. An example of such a belt 62 is manufactured by Burrell Leder Beltech, Inc. and is identified as belt number D92BC. A transparent panel 70 is bonded or adhered to the top surface 64 of the belt 62. The transparent panel 70 has preferrably a rectangular shape. All but one of the edges of the panel 70 are bonded to the top surface 64. Additionally, the panel 70 has a seam 72 which is bonded to the top surface 64. The seam 72 forms a first pocket 74 and a second pocket 76 with the top surface 64 of the belt 62. The pockets 74 and 76 are separated from each other by the seam 72. One edge 78 of the pocket 74 is left unbonded to allow a visual display or advertisement to be easily inserted into or removed from the pocket 74. The edge 78 is preferably the edge parallel with the top edge 66 of the top surface 64 of the belt 62. One edge 80 of the pocket 76 is also left unbonded to allow a visual display or advertisement to be easily inserted into or removed from the pocket 76. The edge 80 is preferably the edge parallel with the top edge 66. As discussed previously, once the device 60 is installed and tensioned properly about the roller assemblies 14 and 16, the unbonded edges 78 and 80 are taunt and the top edge 66 and the edges 78 and 80 are effectively sealed together. The transparent panel 70 is constructed of clear urethane. The edges of the pockets 74 and 76 are bonded to the top surface 64 by using the method of high frequency welding. The seam 72 is also bonded to the top surface by using the method of high frequency welding. The pockets 74 and 76 are sized and shaped to each span half of the length of the belt 62. The device 60 is a light weight device which permits easy installation and removal of the device 60 from the roller assemblies 14 and 16 of the checkout counter 12.

Although the preferred embodiments of the devices 10 and 60 of the present invention are shown and described to have one pocket 34 or two pockets 74 and 76, it should be further recognized that the endless belt display device can be constructed with three or more pockets which are sized and shaped to receive advertisements of various sizes and shapes. For example, with the device 60, to form a third pocket a seam similar to seam 72 would be made.

From all that has been said, it will be clear that there has thus been shown and described herein an endless belt display device which fulfills the various objects and advantages sought therefor. It will be apparent to those skilled in the art, however, that many changes, modifications, variations, and other uses and applications of the subject endless belt display device are possible and contemplated. All changes, modifications, variations, and other uses and applications which do not depart from the spirit and scope of the invention are deemed to be covered by the invention, which is limited only by the claims which follow.

What is claimed is:

1. A visual display device comprising:

a flexible conveyor belt having a top surface and a top edge, means for rotating the belt for recirculating movement along an endless path in a horizontal plane, the rotating means comprising a pair of roller assemblies and tensioning bolts which are loosened to decrease the span between the pair of roller assemblies; and a transparent panel having all but one edge bonded to the top surface of the belt with the unbonded edge being parallel to the top edge, the panel forming a pocket with the belt through which an advertisement is placed to be viewed through the panel while the belt is being recirculated along the endless path in the horizontal plane, the unbonded edge and the top edge being in direct contact with each other as the belt is being rotated and effectively sealed together while the belt is being recirculated along the endless path, the unbounded edge and the top edge being separated by loosening the tensioning bolts to decrease the span between the roller assemblies, and the panel providing a surface upon which articles may be placed.

2. The visual display device of claim 1 wherein the panel extends along a portion of the belt.

3. The visual display device of claim 1 wherein the belt is constructed of polyurethane.

4. The visual display device of claim 1 wherein the panel is constructed of urethane.

5. The visual display device of claim 1 wherein the panel is bonded to the top surface of the belt by high frequency welding.

6. An endless belt display device mounted on a conveyor system having a pair of opposed rollers for rotatably moving the device in a horizontal plane and tensioning bolts which are loosened to decrease the span between the pair of rollers, the device comprising:

a belt formed as a continuous loop encircling the rollers and driven thereby, the belt having a top surface and a top edge; and a transparent panel having all but one edge bonded to the top surface of the belt with the unbonded edge being parallel to the top edge, the panel forming a first pocket and a second pocket with the top surface of the belt, the first pocket receiving a first advertisement through the unbonded edge of the panel and for displaying the advertisement through the panel during rotation of the belt by the rollers, the second pocket formed with the top surface of the belt by forming a seam between the first and second pockets, the second pocket receiving a second advertisement through the unbonded edge of the panel and for displaying the advertisement through the panel during rotation of the belt by the rollers, the unbonded edge and the top edge being in direct contact with each other as the belt is being rotated and effectively sealed together during rotation of the belt by the rollers, the unbonded edge and the top edge being separated by loosening the tensioning bolts to decrease the span between the pair of rollers, and the panel providing a surface upon which article may be placed.

7. The endless belt display device of claim 6 wherein the first pocket extends along a first portion of the belt and the second pocket extends along a second portion of the belt.

8. The endless belt display device of claim 7 wherein the first portion is equal to the second portion.

9. The endless belt display device of claim 6 wherein the belt is constructed of polyurethane.

10. The endless belt display device of claim 6 wherein the first and second panels are each constructed of urethane.

11. The endless belt display device of claim 6 wherein the first and second panels are each bonded to the belt by high frequency welding.

* * * * *